No. 887,597. PATENTED MAY 12, 1908.
U. G. DAVIS.
NUT MAKING MACHINE.
APPLICATION FILED MAR. 9, 1906.
3 SHEETS—SHEET 1.
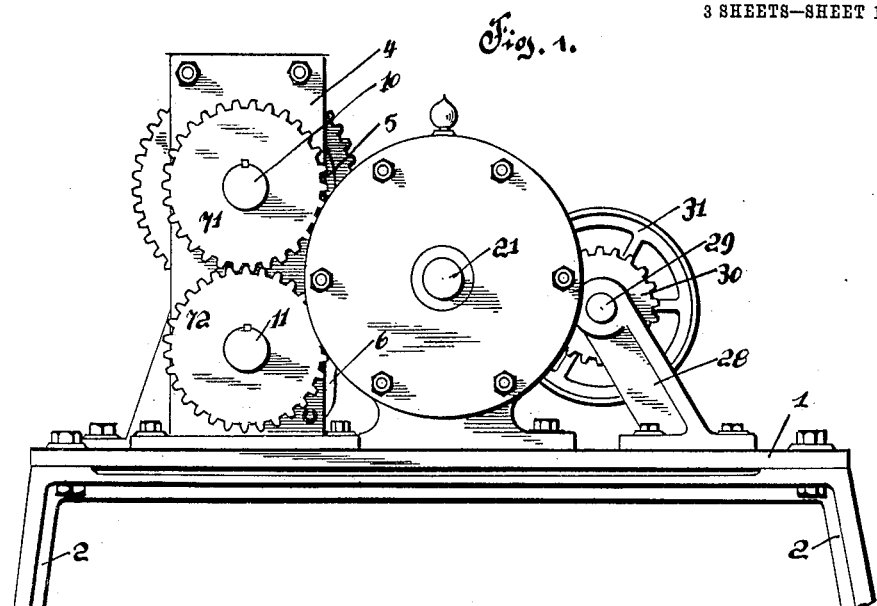
Fig. 1.
Fig. 2.
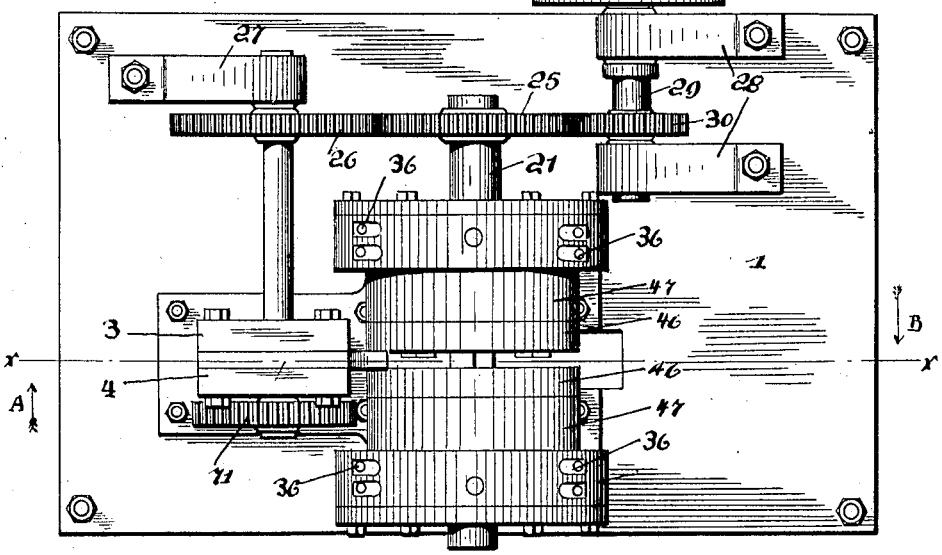
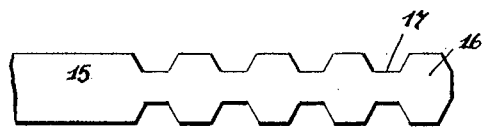
Fig. 3
Witnesses:
C. Klostermann
Inventor.
Ulysses G. Davis.
by H. C. Everett Co.
Attorneys.

No. 887,597. PATENTED MAY 12, 1908.
U. G. DAVIS.
NUT MAKING MACHINE.
APPLICATION FILED MAR. 9, 1906.
3 SHEETS—SHEET 2.
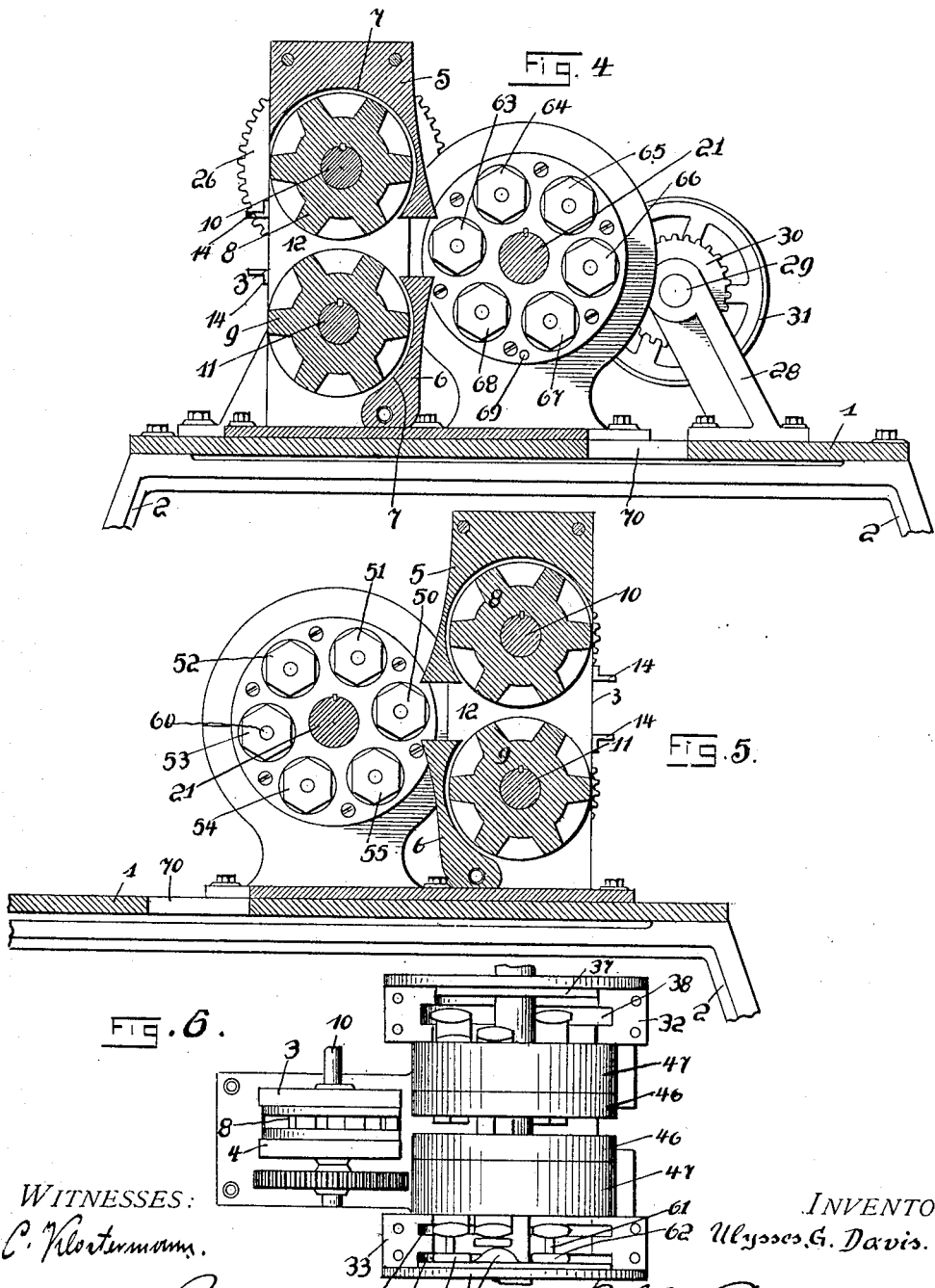
WITNESSES:
INVENTOR
Ulysses G. Davis.
BY
Attorneys No. 887,597. PATENTED MAY 12, 1908.
U. G. DAVIS.
NUT MAKING MACHINE.
APPLICATION FILED MAR. 9, 1906.
3 SHEETS—SHEET 3.
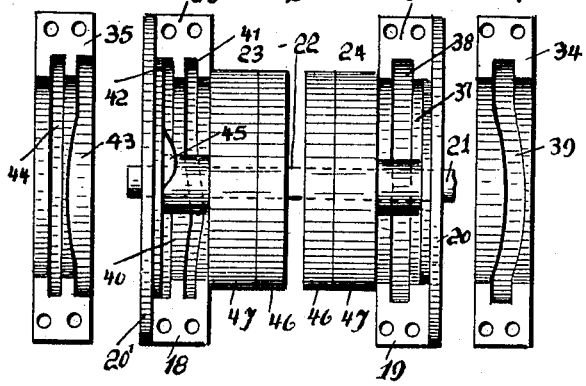
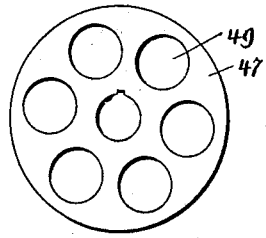
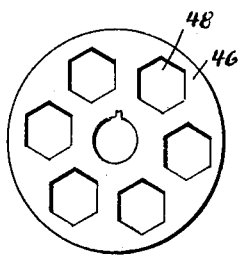
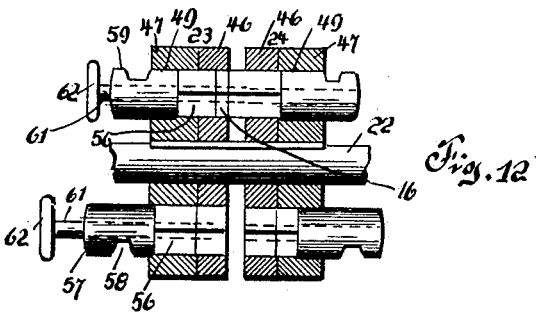
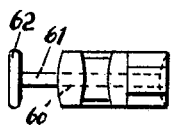
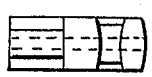

UNITED STATES PATENT OFFICE.

ULYSSES G. DAVIS, OF PITTSBURG, PENNSYLVANIA.

NUT-MAKING MACHINE.

No. 887,597.  Specification of Letters Patent.  Patented May 12, 1908.

Application filed March 9, 1906. Serial No. 305,136.

*To all whom it may concern:*

Be it known that I, ULYSSES G. DAVIS, citizen of the United States of America, residing at Pittsburg, in the county of Allegheny and State of Pennsylvania, have invented certain new and useful Improvements in Nut-Making Machines, of which the following is a specification, reference being had therein to the accompanying drawing.

This invention relates to certain new and useful improvements in nut making machines, and the invention has for its primary object to provide a novel machine for stamping, cutting, pressing and punching nuts from strips of metal. To this end, I have devised positive and reliable means for rapidly forming nuts from strips of metal, said nuts being finished by the machine and automatically delivered to a suitable receptacle placed beneath the machine.

The machine is constructed to continuously operate upon a bar of metal to produce nuts, the various steps of production occurring simultaneously.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 1 is a side elevation of my improved machine, Fig. 2 is a plan of the same, Fig. 3 is a plan of a strip of metal partially acted upon by my improved machine, Fig. 4 is a vertical sectional view of the machine taken on the line x—x of Fig. 2 looking in the direction of the arrow A of said figure, Fig. 5 is a similar view taken on the same line of Fig. 2 looking in the direction of the arrow B, Fig. 6 is a plan of a portion of the machine, a part of the housing thereof being removed, Fig. 7 is a plan of a portion of the machine illustrating the bearings and cam grooves thereof, Figs. 8 and 9 are bottom plan views of bearing plates adapted to fit on that portion of the machine illustrated in Fig. 7, Fig. 10 is a side elevation of a part of one of the revoluble heads of the machine, Fig. 11 is a similar view of another part of one of the heads of the machine, Fig. 12 is a vertical sectional view of the heads of the machine, Fig. 13 is a bottom plan of one of the reciprocating forming members or dies of the machine, Fig. 14 is a similar view of an associate member or die.

In practice I construct my improved machine of a suitable bed or foundation plate 1, having a conventional form of depending legs or supports 2, said legs or supports being suitably secured to said bed plate. Upon the forward end of the bed plate, as it will be hereinafter termed, are mounted two housings 3 and 4, and interposed between said housings and secured thereto are guide plates 5 and 6, said plates being cut away as at 7, 7 to accommodate swaging star wheels 8 and 9, said wheels being keyed upon shafts 10 and 11 respectively journaled transversely in close proximity to one another to form a guide way from the pass 12 of the wheels 8 and 9. In conjunction with the guide plates 5 and 6, I provide the housings 3 and 4 with guide brackets 14, 14, which serve functionally to guide material into the pass 12 of the wheels 8 and 9. In Fig. 3 of the drawings, I have illustrated a piece of material 15, the one end of which has passed between the star wheels 8 and 9 and has been formed with substantially hexagon blanks 16, said blanks being connected together by neck portions 17.

Formed integral with the housings 3 and 4, as a preferable mode of construction, are bearings 18 and 19, said bearings being in alinement with one another and provided with circular end plates 20 and 20'. Journaled concentrically within the plates 20, 20' of the bearings 18 and 19 is a shaft 21 having a central contracted portion 22 upon which two-part heads 23 and 24 are keyed. The shaft 22 upon its one end is provided with a pinion 25 adapted to mesh with a pinion 26 mounted upon the shaft 10 the outer end of said shaft being journaled in a bearing 27 carried by the bed plate 1.

The bed plate 1 is provided with bearings 28, 28 in which is journaled a shaft 29 carrying a pinion 30 adapted to mesh with the pinion 25, and pulley wheels 31, 31 by which the machine is driven. However, I do not care to confine myself to operating my improved machine through the medium of the pulley wheels 31, 31, as a motor (not shown) may be geared to the pinion 30 or the shaft 29 may represent the armature shaft of said motor.

The bearings 18 and 19 besides carrying plates 20 and 20' consist of body portions 32 and 33 having detachable bearing plates 34 and 35 respectively, said plates being secured upon their respective body portions by screw bolts 36. The body portion 32 is provided with semi-circular concavities 37 having a cam groove 38 formed therein. The bearing plate 34, which is mounted upon the body portion 32 of the bearing 19, is provided with a cam groove 39, the ends of which are adapted to register with the ends of the grooves 38 and form an annular cam groove within the bearing 20.

The body portion 33 of the bearing 18 is provided with a concavity 40 having cam grooves 41, and 42 formed therein. The plate 35 which is adapted to fit upon the body portion 33 of the bearing 18 is provided with cam grooves 43, and 44 adapted to register with the grooves 41 and 42 respectively and form annular cam grooves within the bearing 18, the object of said grooves being hereinafter described. The end plate 20' of the bearing 18 is provided with a protuberance or cam shaped lug 45 which will also be hereinafter described.

The heads 23 and 24 mounted upon the shaft 22 consist of circular disks 46 and 47, the disks 46 being provided with a plurality of circumferentially arranged hexagon-shaped openings or sockets 48, while the disks 47 are provided with a plurality of circumferentially arranged circular openings or sockets 49, the openings or sockets 48 of the disks 46 being adapted to aline with the openings or sockets 49 of the disks 47. In the openings or sockets 48 and 49 of the head 23 are mounted forming members or dies 50, 51, 52, 53, 54 and 55, said members or dies being of equal lengths. Each member or die is formed with a hexagon-shaped inner end 56 and a cylindrical shaped outer end 57, the outer face of each member or die being grooved, as at 58, to form tongues 59. Each member or die is provided with a longitudinally disposed bore 60 in which is mounted a punch 61 having a head 62.

In the openings or sockets 48 and 49 of the head 24 are mounted similar members or dies 63, 64, 65, 66, 67 and 68, said members or dies being identical in construction to those heretofore described, with the exception that the punches 61 are dispensed with but the bores are retained as at 60', which are adapted to aline with the bores formed in the members or dies of the head 23.

The plate 20 of the bearing 19 is provided with an opening 69, at the bottom of the concavity 37. The object of said opening will be presently described.

The bed plate 1 beneath the heads 23 and 24 is provided with an opening 70, to permit of the finished nuts to drop into a suitable receptacle (not shown) placed beneath the bed plate 1.

In order that the lowermost star wheel 9 may be simultaneously driven with the upper star wheel 8, I provide the ends of the shafts 10 and 11 with pinions 71 and 72 adapted to mesh with one another.

Operation. After the piece of metal 15 has been swaged by the action of the members 8 and 9 to form a plurality of connected hexagon-shaped blanks, the piece is fed forward between the revolving heads 23 and 24. In the position in which the heads are shown in the accompanying drawings, the first hexagon blank 16 will be gripped between the members 50 and 63 and as the heads slowly revolve, the first hexagon blank will be severed from its succeeding blank, this being rendered possible through the medium of the neck 17 formed between the blanks. When the members or dies 50 and 63 assume the position now occupied by the dies 51 and 64, the dies 50 and 63 will be reciprocated to move the blank within the head 23 and brace the same therein, as shown in Fig. 12 of the drawings. When the members or dies 50 and 63 assume the position now occupied by the members or dies 52 and 65, the punch 61 of the member or die 50 will provide the blank with a central opening, the material punched from the blank being forced through the bore of the member or die 63, dropping into the concavity 37 and passing out of the opening 69. A further movement of the heads 23 and 24 places the members or dies 50 and 63 in the position now occupied by the members or dies 60 and 66. When in this position, the members or dies 50 and 63 are actuated to eject the blank from the head 23, allowing the same to drop between the heads, through the opening 70 of the bed plate into a suitable receptacle beneath said plate.

To reciprocate the members or dies at the proper time, I have provided the circular cam grooves within the bearings 18 and 19. The tongues 59 of the members or dies 50 to 55 inclusive are adapted to travel in the cam grooves 41 and 44 of the bearing 18, while the heads 62 of the punches 61 of said members or dies are adapted to travel in the grooves 42 and 43 of the said bearing 18. The tongues 59 of the members or dies 63 to 68 inclusive, are adapted to travel in the grooves 38 and 39 of the bearings 19, and as the heads 23 and 24, carrying the members or dies, are revolved, the members or dies of said heads will be reciprocated, or moved back and forth to properly handle a blank being operated upon between said heads. As the punches 63 pass the protuberances or cam shaped lug 45 of the bearing 18, the heads 62 of said punches will engage the lug and said punches will be actuated, this operation providing the blanks with a central opening.

It will of course be understood that while the members or dies 50 and 63 are manipulating a blank, the next succeeding members or dies, namely 55 and 68 are gripping a blank, and by using a plurality of members or dies, a partial rotation of the heads 23 and 24 will complete a nut. In using six members or dies, four blanks will be simultaneously handled between the heads 23 and 24, thus leaving two sets of members or dies preparatory to gripping a blank. From the foregoing description taken in connection with the drawings, it will be observed that I have devised a novel machine for forming nuts, and in connecting with said machine have used positive and reliable means for manipulating a nut within the machine, in order that it may be properly operated upon and given the necessary formation.

I do not care to limit the machine to the manufacture of hexagon shaped nuts, as the heads 23 and 24, together with their respective members or dies, may be changed to produce rectangular, circular or octagon-shaped nuts.

The nuts which I have formed by my improved machine are provided with threads by another machine, (not shown) but a threading machine may be readily constructed upon the bed plate of my machine, whereby a finished and complete nut may be produced from a strip of material.

Such changes in the construction and operation of my improved machine, as are permissible by the appended claims, may be resorted to without departing from the spirit and scope of the invention.

What I claim and desire to secure by Letters Patent, is:—

1. In a device of the class described, spaced guides, spaced members mounted for rotation in advance of said guides and between which a bar of blanks is adapted to be directed by said guides, said spaced members provided with transversely alined sockets, plungers movable in said sockets and rotative with said spaced members, and means for moving said plungers toward each other to successively compress said blanks into said sockets.

2. In a device of the class described, a supporting frame, spaced guides carried by said frame, means for feeding a bar which has been formed into a plurality of coupled blanks between said guides, a member mounted for rotation in advance of said guides with its axial line at right angles to the path of said feeding mechanism and provided with a plurality of spaced sockets, means for continuously rotating said socket member, a plurality of plungers corresponding to said sockets, means for carrying said plungers bodily with said socket member, and means for successively actuating said plungers for successively pressing said blanks into said sockets.

3. In a device of the class described, spaced guides, means for feeding a bar which has been formed into spaced coupled blanks past said guides, spaced members mounted for rotation in advance of said guides with their axial lines at right angles to the path of said feeding means and provided respectively with spaced sockets, plungers movable in said sockets and rotative with said spaced members, means for successively moving the plungers of one of said spaced members partly through its sockets, and means for successively moving the plungers of the other spaced member entirely through its sockets, whereby the blanks which are passed between the guides are compressed successively into the sockets of one of said members.

4. In a device of the class described, spaced guides, means for feeding a bar which has been formed into coupled blanks past said guides, a member having a plurality of spaced sockets and disposed in advance of said guides, means for continuously moving said socket carrying members transversely of the path of said bar of blanks, punches movable in said sockets, means for successively compressing said blanks into said sockets, and means for causing said punches to successively puncture said blanks.

5. In a device of the class described, spaced guides, means for feeding a bar of spaced coupled blanks past said guides, members mounted for rotation in advance of said guides and provided with a plurality of spaced sockets, means for continuously rotating said socket carrying members, plungers movable in said sockets and carried bodily with said socket members, compressing devices, fixed means and connections between the fixed means and the plungers whereby said plungers are brought into operation by the rotation of the socket-carrying members to successively compress said blanks into said sockets.

6. In a device of the class described, spaced guides, means for feeding a bar which has been formed into spaced coupled blanks past said guides, members mounted for rotation in advance of said guides and provided with a plurality of spaced concentrically disposed sockets, means for continuously rotating said socket carrying members, plungers carried by said socket carrying members and movable in sockets therein, punches movable through said plungers, compressing devices, and fixed means and connections between the fixed means and the plungers whereby said plungers and punches are brought into operation by the rotation of the socket-carrying members.

7. In a device of the class described, a supporting frame, spaced guides carried by said frame, means for feeding a bar which has been formed into spaced blanks past said guides, spaced bodies mounted for rotation in advance of said guides and provided with a plurality of transversely alined sockets, plungers operating in said sockets, bearings carried by said frame and provided with internal cams adapted to engage said plungers and intermittently move them toward each other to successively compress said blanks into said sockets.

8. In a device of the class described, a supporting frame, spaced guides carried by said frame, means for feeding a bar which has been formed into spaced coupled blanks past said guides, spaced bodies mounted for rotation upon said frame and each formed with two superimposed plates, one plate having a plurality of circular sockets, and the other plate provided with a plurality of sockets corresponding to said blanks, plungers having circular portions for engaging said circular sockets, and with portions corresponding to the blank-shaped sockets, means for actuating said rotary bodies, and means operative by the rotation of the rotating members for moving said plungers toward each other to cause them to compress said blanks into said blank-shaped sockets.

In testimony whereof I affix my signature in the presence of two witnesses.

ULYSSES G. DAVIS

Witnesses:
K. H. BUTLER,
E. E. POTTER